United States Patent
Morrison et al.

(10) Patent No.: US 6,370,189 B1
(45) Date of Patent: Apr. 9, 2002

(54) APPARATUS AND METHODS FOR VARIABLE DELAY CHANNEL TRACKING

(75) Inventors: Christine J. Morrison, Decatur; Errol Reiss, Chamblee, both of GA (US); Liliana Aidorevich, Maracay Edo Aragua (VE); Jong Soo Choi, Taegu (KR)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/085,435

(22) Filed: May 27, 1998

(51) Int. Cl.[7] .......................... H04B 3/46; H03M 13/03
(52) U.S. Cl. ..................... 375/224; 375/341; 714/794
(58) Field of Search .................. 375/224, 341, 375/340, 130; 714/794, 795

(56) References Cited

U.S. PATENT DOCUMENTS

| | | | |
|---|---|---|---|
| 5,251,237 A | 10/1993 | Baier | 375/99 |
| 5,263,033 A * | 11/1993 | Seshadri | 714/792 |
| 5,323,421 A * | 6/1994 | LaRosa et al. | 375/224 |
| 5,446,763 A | 8/1995 | Baum et al. | 375/340 |
| 5,506,861 A * | 4/1996 | Bottomley | 370/441 |
| 5,544,156 A | 8/1996 | Teder et al. | 370/18 |
| 5,586,143 A * | 12/1996 | Whinnett | 375/229 |
| 5,862,192 A * | 1/1999 | Huszar et al. | 375/347 |
| 6,021,161 A * | 2/2000 | Yamaguchi et al. | 375/232 |
| 6,084,929 A * | 7/2000 | Molnar et al. | 375/350 |
| 6,240,099 B1 * | 5/2001 | Lim et al. | 370/441 |

FOREIGN PATENT DOCUMENTS

GB 2 189 669 10/1987
WO WO 98/56146 12/1998

OTHER PUBLICATIONS

Libing Wu, et al., A New Short–Block Digital Transmission Scheme With Adaptive MLSE for Mobile Radio Channels, *Institute of Electrical and Electronics Engineers,* vol. 1, pp. 243–247, 6/94.
Copy of International Search Report for PCT/US99/08739.

* cited by examiner

Primary Examiner—Chi Pham
Assistant Examiner—Khai Tran
(74) Attorney, Agent, or Firm—Myers Bigel Sibley & Sajovec

(57) ABSTRACT

The present invention provides apparatus and methods in which variable delay is provided for channel tracking. In particular, a demodulator having both a hard output (or symbol estimate) and a soft output (or indication of the quality of the symbol estimate) is coupled to a channel tracker. The channel tracker provides a channel estimate used by the demodulator, in part, to correct for fading. The channel tracker updates the channel estimate based on the symbol estimates from the demodulator and the received signal. However, when the soft output indicates a low confidence in the symbol estimate, the symbol estimate is not used to update the channel estimate. This is accomplished by providing a variable delay to the channel estimate calculation performed by the channel tracker depending on the number of consecutive suspect symbol estimates. For example, a single suspect estimate generates a delay of one causing the most recent estimate to not be used, two consecutive suspect estimate generates a delay of two causing the two most recent estimates to not be used and so on. Accordingly, the channel tracker of the present invention utilizes only the most reliable data available locally to generate a channel estimate for use by the demodulator.

23 Claims, 4 Drawing Sheets

APPARATUS AND METHODS FOR VARIABLE DELAY CHANNEL TRACKING

FIELD OF THE INVENTION

The present invention relates to communications apparatus and methods, more particularly, to apparatus and methods for tracking a communication channel.

BACKGROUND OF THE INVENTION

Wireless communications systems such as cellular radiotelephone systems typically include a plurality of communication channels which may be established between a first transceiver (such as a base station) and a second transceiver (such as a mobile terminal). The communication channels typically are subject to performance-degrading environmental effects such as multi-path fading and interference (noise). Fading effects include flat fading which may arise from the interaction of a transmitted signal (the main ray) with reflected versions of the transmitted signal that arrive concurrently at a receiver. Time dispersion, another type of fading, may arise from interaction of the main ray with time-delayed reflections of the main ray. Interference effects may be caused by interaction of non-orthogonal signals generated in the signal medium by sources other than the source of the desired transmitted signal. Well-known techniques for reducing the effects of fading include diversity combining of signals from spatially separated antennas. Equalization techniques such as maximum likelihood sequence estimation (MLSE) may be used to compensate for time dispersion. Interference may be reduced by using antenna beam steering to reduce reception of undesired signals.

Fading is typically a major detriment to the performance of demodulators in communication systems. The receiver of a mobile terminal typically includes a demodulator which may be a coherent demodulator such as a maximum likelihood sequence estimator (MLSE) demodulator. To provide for reliable demodulation of a received signal, an associated channel tracker is typically provided for the demodulator. After acquisition of a communicated signal by the receiver, the channel tracker maintains a channel estimate to provide a coherent reference between the demodulator and the received signal.

Unfortunately, however, under certain circumstances, tracking by the channel tracker may be disrupted due to, among other things, fading effects. When tracking is disrupted, the demodulator may lose its coherent reference which may result in errors in the demodulation of the received signal. In a fast fading channel, it is typical to see one or more short deep fades over the duration of a communication burst. A short deep fade tends to cause a burst of errors, even with a high average signal to noise ratio (SNR) as the coherent reference of the demodulator may be lost during the fade. Accordingly, there is a need for improved techniques of channel tracking.

SUMMARY OF THE INVENTION

In light of the foregoing, it is an object of the present invention to provide apparatus and methods for channel tracking which are less subject to bursts of errors such as may be caused by fading.

It is another object of the present invention to provide apparatus and methods for channel tracking suitable for use with coherent demodulators providing soft and hard information.

It is yet another object of the present invention to provide apparatus and methods for channel tracking suitable for use with bidirectional demodulation.

These and other objects, features and advantages are provided according to the present invention by apparatus and methods in which variable delay is provided for channel tracking. In particular, a demodulator having both a hard output (or symbol estimate) and a soft output (or indication of the quality of the symbol estimate) is coupled to a channel tracker. The channel tracker provides a channel estimate used by the demodulator, in part, to correct for fading. The channel tracker updates the channel estimate based on the symbol estimates from the demodulator and the received signal. However, when the soft output indicates a low confidence in the symbol estimate, the symbol estimate is not used to update the channel estimate. This is accomplished by providing a variable delay to the channel estimate calculation performed by the channel tracker depending on the number of consecutive suspect symbol estimates. For example, a single suspect estimate generates a delay of one, causing the most recent estimate to not be used, two consecutive suspect estimate generates a delay of two, causing the two most recent estimates to not be used and so on. Accordingly, the channel tracker of the present invention utilizes only the most reliable data available locally to generate a channel estimate for use by the demodulator.

In one aspect of the present invention, a method for tracking a modulated signal transmitted over a communications medium is provided. A modulated signal from a communication channel is received. The received signal is demodulated based on a channel estimate to provide a symbol estimate and an indication of the quality of the symbol estimate. The channel estimate is updated with a variable delay based on the received signal, the symbol estimate and the indication of quality of the symbol estimate. In one embodiment of the present invention the channel estimate is updated by first comparing the indication of quality of the symbol estimate to an acceptance value. An updated channel estimate is generated based on the symbol estimate if the indication of quality of the symbol estimate meets the acceptance value or based on a previous symbol estimate having an indication of quality which meets the acceptance value if the indication of quality of the symbol estimate does not meet the acceptance value.

In a further embodiment of the present invention, the previous symbol estimate has an associated delay relative to the symbol estimate. The updated channel estimate is generated based on a previous symbol estimate having an indication of quality which meets the acceptance by establishing a tracking coefficient based on the associated delay. The updated channel estimate is then generated based on the tracking coefficient. The tracking coefficient for one embodiment is established by raising a base tracking coefficient to the power of the associated delay to provide the tracking coefficient.

In another embodiment of the present invention, the received signal is demodulated by coherently demodulating the received signal using maximum likelihood sequence estimation. The indication of quality of the symbol estimate in this embodiment may be the soft output derived in conjunction with the maximum likelihood sequence estimation. Furthermore, maximum likelihood sequence estimation may include a plurality of candidate states each providing an associated symbol estimate and indication of the quality of the associated symbol estimate. In this case, a separate updated channel estimate is generated for each state based on the associated symbol estimate and indication of the quality of the associated symbol estimate for each state.

The indication of quality of the symbol estimate may also be a received signal strength indication. The channel tracker may be a Kalman-type tracker or a least mean square (LMS) tracker.

While the invention has been described above primarily with respect to the method aspects of the invention, apparatus for performing the methods are also provided. In a further embodiment of the present invention a variable delay channel tracker for a modulated signal receiver apparatus including a demodulator having hard and soft outputs is provided. The channel tracker includes a variable delay channel tracker circuit having a channel estimate output coupled to the demodulator and a delay determination circuit coupled to the soft output of the demodulator and the channel tracker. The variable delay channel tracker circuit may be a Kalman-type tracker or a LMS tracker.

In a further embodiment of the present invention, the delay determination circuit includes means for comparing the soft output to an acceptance value and means for providing an indication to the variable delay channel tracker circuit to update the channel estimate based on the hard output if the soft output meets the acceptance value. The delay determination circuit further includes means for providing a delay count to the variable delay channel tracker circuit for use in generating the channel estimate output if the soft output does not meet the acceptance value.

Accordingly, the methods and apparatus of the present invention provide for improved channel tracking by updating the channel estimate with the best locally available data by the use of a variable delay channel tracker. The channel tracker of the present invention is thereby better able to prevent propogation of errors by channel effects such as deep fading during a transmission.

DETAILED DESCRIPTION OF PREFERRED EMBODIMENTS

Figure 1:
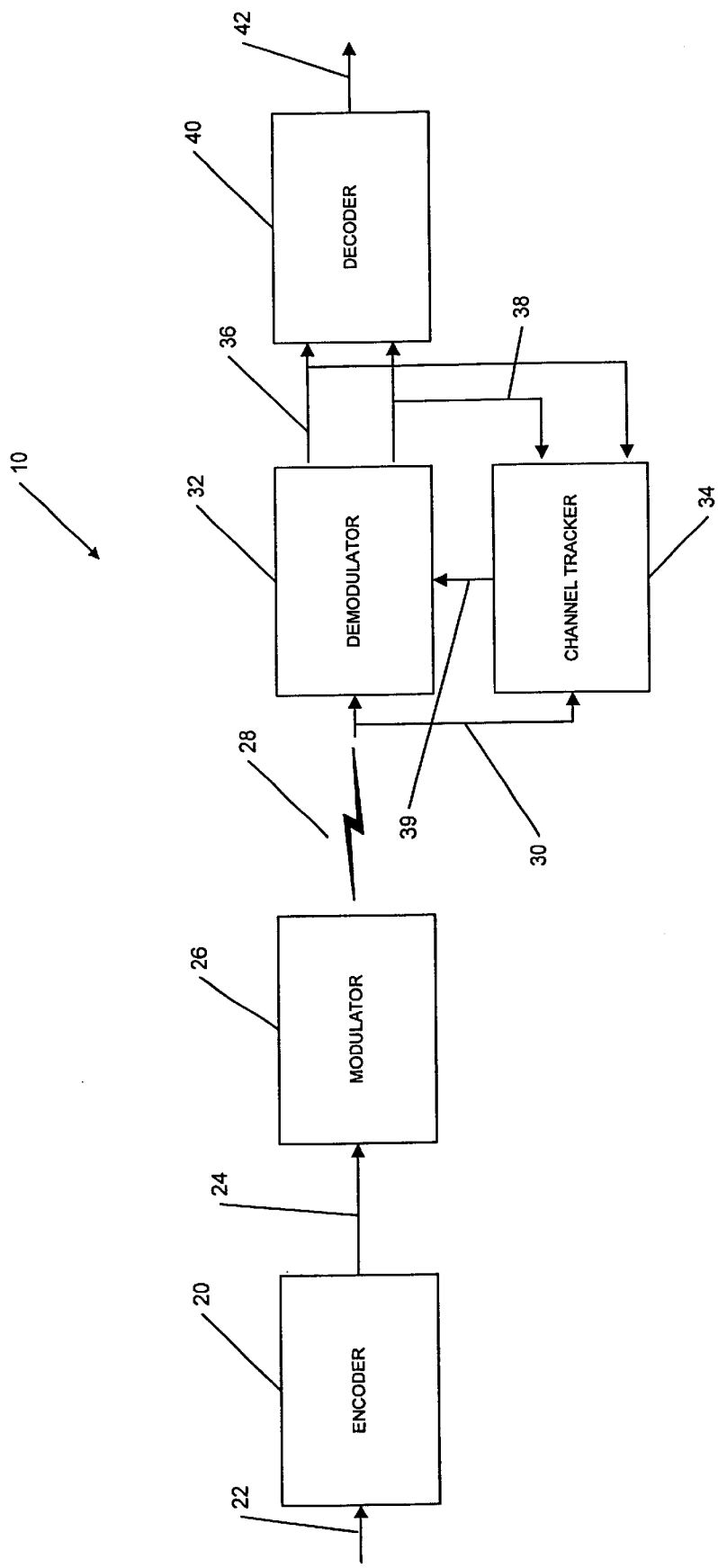
FIG. 1 is a schematic illustration of a communication system including a receiver having a demodulator with a variable delay channel tracker according to an embodiment of the present invention.

The present invention now will be described more fully hereinafter with reference to the accompanying drawings, in which embodiments of the invention are shown. Those skilled in the art will appreciate that the invention may be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements throughout.

Referring now to FIG. 1, communication system 10 includes a transmitter portion including encoder 20 and modulator 26. Data 22 to be communicated over communication channel 28 is provided to encoder 20. Communication channel 28 may be a radio communication channel in which case the modulated signal received by demodulator 32 is a radio communication signal. Data 22 is typical binary bits having a state of one or zero. Encoder 20 may be a block encoder, convolutional encoder or other type error correction encoder or error detection encoder. The encoded symbols $a_i$ 24 are output from encoder 20 and provided to modulator 26. Modulator 26 in turn modulates the symbols for transmission over communication channel 28 by generating a transmitted signal which can be generally described by:

$$s(t)=\Sigma a_i p(t-iT). \qquad (1)$$

where $T_i$ is the symbol period, $a_i$ is the i-th symbol and p(t) is the transmitter pulse which is, for example, in D-AMPS, a root raised cosine.

Also shown in communication system 10 is a receiver including demodulator 32, channel tracker 34 and decoder 40. The transmitted signal s(t) from modulator 26 is affected by noise and other channel affects during transmission over channel 28 and received by demodulator 32 as the received signal r(t). The relationship between the received and transmitted signal may be generally characterized by:

$$r(t)=c(t)s(t)+v(t) \qquad (2)$$

where r(t) is the received signal, c(t) is the fading effect, s(t) is the signal transmitted and v(t) generally represents noise effects of channel 28 apart from the fading component. Equation 2 is expressed in terms of a flat channel for simplicity but it may be extended to non-flat channel models. Furthermore, in baseband, the signal is typically sampled and digitized. For simplicity, the case of one sample per symbol is described. However, the case of multiple samples per symbol follows readily and also may benefit from the novel aspects of the present invention.

At a given time n, the received signal $r_n$ is fed to demodulator 32. Demodulator 32 compares $r_n$ to a locally synthesized value $c_n s_n$ where $c_n$ is a channel estimate associated with the fading component of communication channel 28 and $s_n$ represents a hypothesized symbol value generated by demodulator 32.

The channel estimate $c_n$ 39 is produced by channel tracker 34 which uses the received signal 30 and past detected symbols generated by demodulator 32 to update the channel estimate. Channel tracker 34 and demodulator 32 thereby interact in a potentially unstable fashion as channel estimates 39 from channel tracker 34 are used to improve symbol determination by demodulator 32 and the determined symbols from demodulator 32 are in turn fed to channel tracker 34 and used in generating channel estimate 39. It is, therefore, desirable, according to the teachings of the present invention, to reduce the potential for bad symbol estimates from demodulator 32 to cause the channel tracker 34 to generate an inaccurate channel estimate 39.

The potential problem for error amplification caused by interplay between demodulation and tracking will now be further generally described. For purposes of illustration, it is assumed that demodulator 32 and channel tracker 34 are initially synchronized at which point communication channel 28 experienced a fade. Due to a low local SNR, an erroneous symbol is generated by demodulator 32. For an untracked demodulator, the symbol error will not affect future demodulation. In a coherent demodulator over a wireless channel, tracking is generally necessary. However, in a standard channel tracker, the incorrect symbol is fed to the channel tracker and typically causes it to deviate from the correct channel trajectory. For a typical tracker with a finite impulse response (FIR) structure, it takes several symbol periods for this error to dissipate. In the meantime, the channel tracker provides the demodulator with an incorrect channel estimate, in particular, an incorrect phase reference. In turn, this causes the demodulator to potentially make another symbol error and so on. As the communication channel comes out of its fade, the local SNR rises enough for the tracker to stabilize. However, at this point, the channel tracker's phase, which is typically a crucial quantity in a phase shift keyed (PSK) system, may be off.

In a coherent modulation scheme such as quadrature phase shift keyed (QPSK), a phase offset may be catastrophic causing a large number of detected symbols to be in error. This affect may be reduced in a differential demodulation scheme such as differential QPSK where phase offset can be overcome in that it does not continue error propagation. This distinction is based on the fact that QPSK relies upon absolute phase, causing a 90 degree tracking error to result in continuing error propagation, where differential QPSK is based on differential phase. The present invention overcomes this error propagation problem by allowing the channel tracker 34 to use the most reliable data available to it locally. In particular, the present invention provides this capability by a variable delay channel tracker.

As illustrated in FIG. 1, the channel tracker 34 of the present invention receives the received signal r(n) 30. It also receives both symbol estimate s(n) 36 and an indication of the quality of the symbol estimate (quality output) 38 from demodulator 32.

The indication of the quality 38 may, for example, be the soft output or metric from an MLSE type demodulator. The indication of a signal quality may also be a received signal strength indication. Outputs 36 and 38 of demodulator 32 are also provided to decoder 40 which, in turn, decodes the symbol estimates 36 to provide an estimate of the transmitted data 42.

Demodulator 32 provides a means for demodulating the received signal based on a channel estimate 39 to provide a symbol estimate 36 and an indication of the quality of the estimate 38. While not shown in FIG. 1, a means for receiving demodulated symbols from the communications medium 28 is typically provided to convert the modulated signal from its carrier frequency rate to a symbol period related rate for processing by demodulator 32 and channel tracker 34. Channel tracker 34, in turn, provides a means for updating the channel estimate 39 with a variable delay based on the received signal 30, the symbol estimate 36 and the indication of the quality of the symbol estimate 38. More particularly, channel tracker 34 provides a means for comparing the indication of quality of the symbol estimate 38 to an acceptance value and for generating an updated channel estimate 39 based on the symbol estimate 36 if the indication of quality of the symbol estimate meets the acceptance value. If the indication of quality does not meet the acceptance value, channel tracker 34 provides a means for generating an updated channel estimate based on a previous symbol estimate having an indication of quality which meets the acceptance value.

Figure 2:
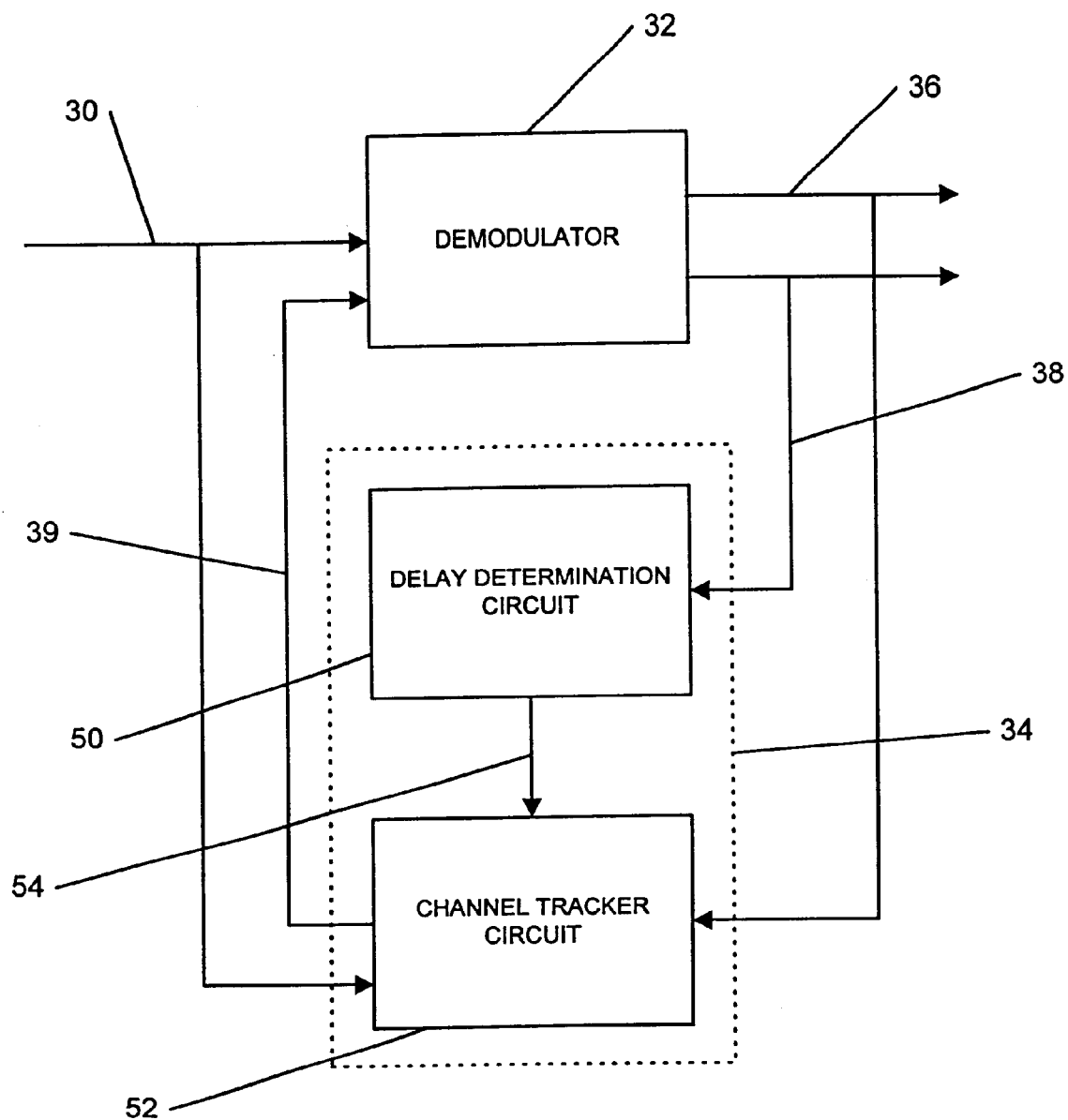
FIG. 2 is a schematic illustration of a demodulator and a variable delay channel tracker according to an embodiment of the present invention.

Referring now to FIG. 2, an embodiment of an apparatus for tracking a modulated signal transmitted over a communication channel according to the present invention will be further described. For the illustrated embodiment of FIG. 2, channel tracker 34 includes delay determination circuit 50 and channel tracker circuit 52. Channel tracker circuit 52 in the illustrated embodiment is a Kalman-type tracker. For purposes of this discussion, the received signal 30 will be referred to as r(n) with n corresponding to the sequential increments of time for operations of the demodulator and tracker. The channel estimate, which is sometimes referred to as a channel tap estimate, at time n given data up to time m is denoted $c_{n|m}$. The demodulated symbols 36 from demodulator 32 are denoted by s(n). For the second order tracker case this relationship is given by equation 3:

$$x_{n+1|n} = Fx_{n|n-1} + Ms^*(n)e(n) \qquad (3)$$

where $$X_{n|n-1} = c_{n|n-1} \, c_{n-1|n-1}$$

and $$e(n) = r(n) - c_{n|n-1}s(n)$$

F and M are initially fixed matrices established based, for example, on simulations for the particular receiver apparatus and channel environment in which the channel tracker is to be operated. The expressions as described herein are for a one-tap channel. However, the present invention may also be applied for a multiple tap channel wherein each tap is tracked independently using an expression such as those above.

For the embodiment illustrated in FIG. 2, the demodulator 32 is a maximum likelihood sequence estimation (MLSE) demodulator with a single channel tracker. It is to be understood that a MLSE demodulator has a trellis structure, i.e., a finite state machine with a time axis. Each stage of the trellis represents a unit of time. At time n, a series of computations determines the best path, or sequence of symbols, that ends in each state. In general, the paths ending in different states are different. For the path ending in each state, the symbol s(n) 36 is a tentative decision. It is fed to the tracker 52. Channel tracker circuit 52 may use the tentative decision symbol 36 to update its channel estimate 39 at time n+1 using equation 3 above depending upon the variable delay applied as will be described further below. The resulting $x_{n+1|n}$ is the channel estimate 39 fed back to demodulator 32 to be used at stage n+1 in the trellis for transitions starting at that state. A separate channel tracker circuit 52 may be maintained for each state in the demodulator trellis. This demodulator structure is generally referred to as channel model per state (CMS).

It is to be understood that the benefits of the present invention may be obtained with different types of demodulators including other standard variations of the MLSE demodulator structure described above. For instance, a single channel tracker may be used rather than a separate tracker for each state. For this variant, at time n, the best state is determined based on a cumulative metric which is maintained for each state. Under expected reasonable channel conditions, the paths ending in different states tend to merge after some delay. That is, symbols associated with different paths tend to be the same up to some time n−d. The symbol s (n−d) associated with the path of a selected state is fed to the channel tracker circuit 52. The fixed delay d for this type of demodulator 32 is utilized with the objective of obtaining increased reliability from the higher reliability estimate at s (n−d) as compared to at s (n). The channel tracking equations for this variation are similar to equation 3 above and may be expressed as follows:

$$x_{n-d+1|n-d} = Fx_{n-d|n-d-1} + Ms^*(n-d)e(n-d)$$

Depending upon quality output 38, channel tracker circuit 52 may extrapolate or predict the channel estimate 39 for time n+1 using the following equation:

$$x_{n+1|n-d} = F^d x_{n-d+1|n-d}$$

This channel estimate is then provided to demodulator 32 to be used at stage n+1 in the trellis for all state transitions. This variation on the demodulator structure is referred to as a single channel model (SCM).

The variable delay capability of channel tracker 34 for the illustrated embodiment of FIG. 2 is provided by delay determination circuit 50. The quality output value 38 from demodulator 32 is provided to delay determination circuit 50. If the quality output value 38 indicates a high confidence in the symbol estimate 36, delay determination circuit 50 detects the acceptable symbol quality indication as it includes a means for comparing the quality output 38 to an acceptance value which may be predetermined and stored in a memory coupled to delay determination circuit 50. High confidence symbol estimates are used to quickly update the channel estimate 39 from channel tracker 52 and, accordingly, under these conditions, delay determination circuit 50 indicates no delay to channel tracker circuit 52. Operations for updating the channel estimate 39 may then continue as described above.

When the quality output 38 of the demodulator 32 indicates a low confidence in the most recently generated symbol estimate 36, the apparatus and methods of the present invention preferably do not use the estimate 36 to update the channel estimate 39. Accordingly, channel tracker circuit 52 must adjust the channel estimate 39 based on an earlier symbol estimate which had a sufficiently high indication of quality. For example, if the quality output for the symbol estimate for time n−1 is sufficiently large, channel tracker circuit 52 receives a delay indication 54 from delay determination circuit 50 of one, indicating that the most recent symbol estimate 36 should not be utilized. Accordingly, channel tracker circuit 52 generates its channel estimate update according to the following equation:

$$x_{n+1|n-1} = F x_{n|n-1}$$

Further delay values may be utilized if multiple consecutive estimates indicate a low confidence in the estimate. For example, if both estimates s(n) and s(n+1) fail to meet the acceptance criteria, then channel tracker circuit 52 generates its updated channel estimate for time n+2 based on the following equation:

$$x_{n+2|n-1} = F^2 x_{n|n-1}$$

in the more general case, the following equation applies:

$$x_{n+1+d|n} = F^d x_{n+1|n}$$

It is be expected that, as the communication channel 28 comes out of its deep fade, the values of the quality output 38 will improve and the delay 54 will be expected to return to zero. Accordingly, the variable delay channel tracker 34 of the present invention provides an improved tracker which is less subject to error propagation from deep fade conditions.

Variable delay channel tracker 34 of the present invention may be used with either the CMS or SCM demodulator structure as described above. In the case of the CMS version, each state has a separate channel tracker 34. Accordingly, at any time, the various trackers can have different delays depending upon the relative reliability of the symbol estimates along each path. Note that, while the multiple channel tracker variation is not specifically illustrated in FIG. 2, each of the separate channel trackers would operate identically to the description provided above for the single channel tracker version. Furthermore, while the channel tracker was described above in the equations, for a CMS tracker having no fixed delay component, it is to be understood that the present invention may be equally applied to an SCM by providing variable delay instead of the fixed delay provided by known SCM demodulators. In such a case, channel tracker circuit 52 increases the delay beyond the fixed delay of the demodulator to avoid using unreliable symbol estimates. It is also possible in such a case that channel tracker 34 would reduce the delay below the fixed delay although, typically, the reliability of very recent decisions in such systems is low so that the delay would not be expected to reduce below the fixed delay.

While described herein generally with reference to comparing the indication of quality to an acceptance value which is a preset quality threshold, the acceptance value may be variable. For example, the acceptance value may rely on the relative quality of the present detected symbol with respect, preferably, to its immediate predecessors. For the case of CMS, the predecessors are on the surviving path ending in the state of interest. For the case of SCM, the predecessors are on the surviving path ending in the current best state.

In a further embodiment of the variable delay channel tracker 34 of the present invention, channel tracker 34 considers both the quality output 38 and the magnitude of the variable delay in reaching its updated delay input 54. Accordingly, if the length of the fade encountered on communication channel 28 is sufficiently long with respect to a maximum duration criteria, channel tracker circuit 52 utilizes a symbol estimate 36 which would not otherwise meet the acceptance criteria for channel tracker 34 to update the channel estimate 39. In a further embodiment of the variable delay channel tracker of the present invention, channel estimates for time n+1 may be generated from several symbol estimates 36 having a sufficient confidence level instead of a single estimate as described above.

While the invention has been described above with respect to a MLSE demodulator for purposes of conveying the invention to one of ordinary skill in the art, it is to be understood that the invention may be applied to other demodulation apparatus and methods which utilize channel tracking to obtain a coherent channel reference. In particular, the channel tracker of the present invention may be beneficially utilized with coherent demodulators having only a single state and with decision feedback equalizers (DFE). The channel tracker of the present invention may also be used with bidirectional demodulation in which a complete burst having synchronization segments at the beginning and end of the burst is received and demodulation is then performed in a forward direction for a portion of the bits and in a reverse direction for the remaining bits. Bi-directional demodulation may provide for improved performance in approaching a deep fade from both sides of the burst as it would be expected to result in only half the amount of variable delay. This approach minimizes the potential for bad channel tracking due to extrapolation with long delays.

Those skilled in the art will appreciate that the apparatus illustrated in FIGS. 1 and 2 may include a variety of commonly-used communications components. For example, the apparatus of FIG. 1 may be implemented using one or more digital signal processor (DSP) chips and/or application specific integrated circuits (ASICs). In general, it will be appreciated that the apparatus of FIGS. 1 and 2 may be implemented using special-purpose hardware, software or firmware running on general or special purpose data processors, and combinations thereof.

Figure 3:
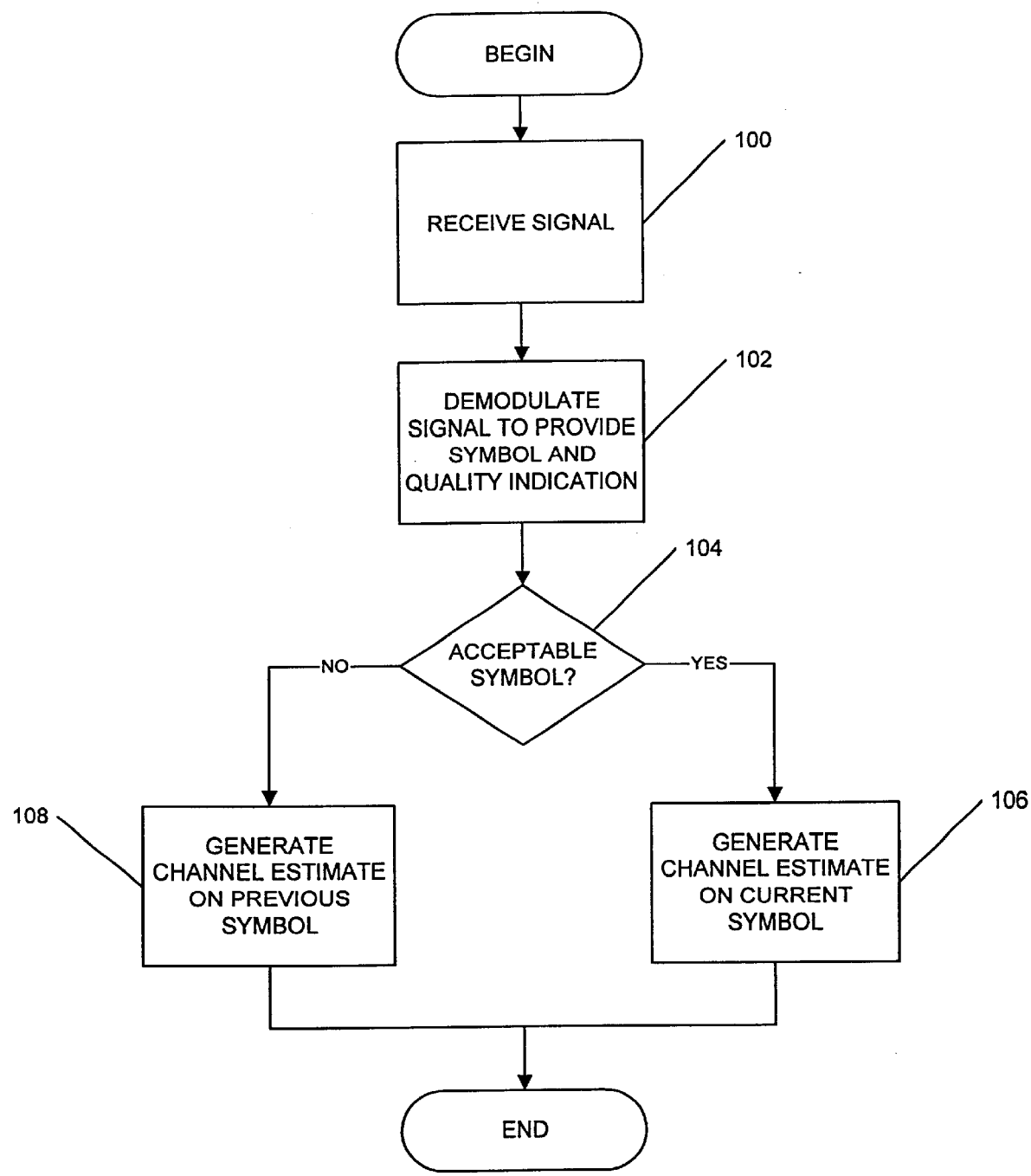
FIG. 3 is a flowchart illustration of operations for channel tracking according to an embodiment of the present invention.

Operations according to an embodiment of the present invention will now be described with reference to the flowcharts of FIGS. 3 and 4. Referring first to FIG. 3, operations begin at block 100 by receiving the demodulated signal from a communication channel. At block 102, the received signal is demodulated based on a channel estimate to provide a symbol estimate and an indication of the quality of the estimate. The channel estimate is in turn updated with a variable delay based on the received signal, the symbol estimate and the indication of quality of the symbol estimate as will be described in connection with blocks 104–108. As shown at block 104, the indication of quality of the symbol estimate is compared to an acceptance value. If the indication of quality of the symbol estimate meets the acceptance value, in other words, if the estimate of the symbol is indicated to be a high confidence estimate of the received symbol, an updated channel estimate is generated at block 106 based on the symbol estimate. However, as illustrated at block 108, if the indication of quality of the symbol estimate does not meet the acceptance value, then the updated channel estimate is generated based on a previous symbol estimate having an indication of quality which meets the acceptance value. Accordingly, a variable delay is provided depending upon how many successive symbol estimates fail to meet the acceptance value.

Figure 4:
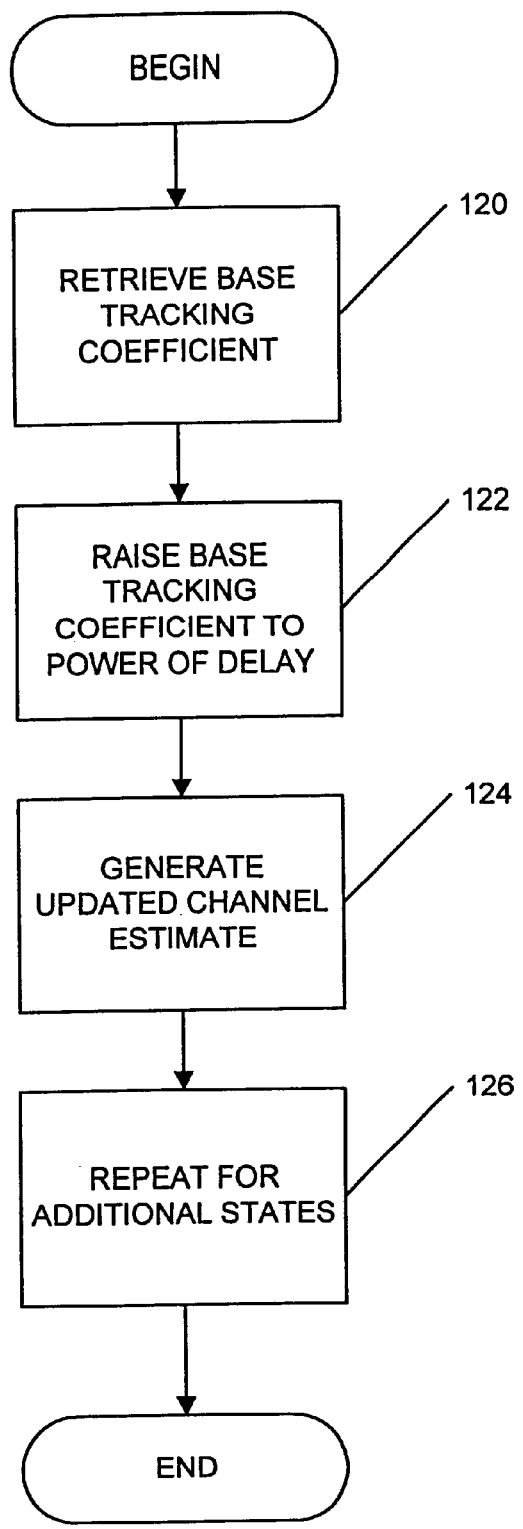
FIG. 4 is a flowchart illustration of operations for updating a channel estimate according to an embodiment of the present invention.

Referring now to FIG. 4, operations for generating a channel estimate based on a previous symbol estimate at block 108 will be further described. Each previous symbol estimate has an associated delay relative to the current symbol estimate. For example, a single suspect symbol estimate corresponds to a delay of one, two consecutive suspect symbol estimates correspond to a delay of two and so on. Operations corresponding to block 108 where a tracking coefficient is established based on this associated delay are illustrated at blocks 120–124. At block 120, a base tracking coefficient is retrieved for use in establishing a tracking coefficient (F). Note that the base tracking coefficient is the same tracking coefficient which is utilized in generating a channel estimate on a current symbol estimate as described at block 106 of FIG. 3. However, as seen in block 122, for estimates based on previous symbols, the base tracking coefficient is raised to the power of the associated delay. At block 124 an updated channel estimate is generated based on the resulting tracking coefficient.

As described previously in connection with the apparatus aspects of the present invention, the variable delay channel tracking operations of the present invention may be provided in connection with an MLSE demodulator which includes a plurality of candidate states each providing an associated symbol estimate and indication of the quality of the associated symbol estimate (referred to above as a CMS configuration). In such a case, as illustrated at block 126, operations at block 120–124 are repeated for each of the additional states. Accordingly, a separate updated channel estimate is provided for each state based on the associated symbol estimate and indication of the quality of the associated symbol estimate for each state. It is to be understood that, as each state is generated separately, the delay value for each state may vary, thereby resulting in a different tracking coefficient being generated at block 122 for each of the respective channel trackers. Updating operations at block 124 may be performed, according to one embodiment of the present invention, using a Kalman-type tracker.

It will be understood that each block of the flowchart illustrations, and combinations of blocks in the flowchart illustrations, can be implemented by computer program instructions. These program instructions may be provided to a processor to produce a machine, such that the instructions which execute on the processor create means for implementing the functions specified in the flowchart block or blocks. The computer program instructions may be executed by a processor to cause a series of operational steps to be performed by the processor to produce a computer implemented process such that the instructions which execute on the processor provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based systems which perform the specified functions or steps, or combinations of special purpose hardware and computer instructions.

In the drawings and specification, there have been disclosed typical embodiments of the invention and, although specific terms are employed, they are used in a generic and descriptive sense only and not for purposes of limitation, the scope of the invention being set forth in the following claims.

That which is claimed is:

1. A method for tracking a modulated signal transmitted over a communication channel comprising the steps of:

receiving the modulated signal from the communication channel;

demodulating the received signal based on a channel estimate to provide a symbol estimate and an indication of the quality of the symbol estimate; and updating the channel estimate with a variable delay wherein the variable delay is based on the indication of quality of the symbol estimate.

2. A method according to claim 1 wherein the updating step comprises the steps of:

comparing the indication of quality of the symbol estimate to an acceptance value;

generating an updated channel estimate based on the symbol estimate if the indication of quality of the symbol estimate meets the acceptance value; and generating an updated channel estimate based on a previous symbol estimate having an indication of quality which meets the acceptance value if the indication of quality of the symbol estimate does not meet the acceptance value.

3. A method according to claim 2 wherein the previous symbol estimate has an associated delay relative to the symbol estimate and wherein the step of generating an updated channel estimate based on a previous symbol estimate having an indication of quality which meets the acceptance value if the indication of quality of the symbol estimate does not meet the acceptance value further comprises the steps of:

establishing a tracking coefficient based on the associated delay; and generating an updated channel estimate based on the tracking coefficient.

4. A method according to claim 3 wherein the establishing step comprises the step of raising a base tracking coefficient to a power corresponding to the associated delay to provide the tracking coefficient.

5. A method according to claim 4 wherein the modulated signal is a radio communication signal.

6. A method according to claim 4 wherein the demodulating step further comprises the step of coherently demodulating the received signal using maximum likelihood sequence estimation.

7. A method according to claim 6 wherein:

the maximum likelihood sequence estimation includes a plurality of candidate states each providing an associated symbol estimate and indication of the quality of the associated symbol estimate; and wherein the updating step provides a separate updated channel estimate for each state based on the associated symbol estimate and indication of the quality of the associated symbol estimate for each state.

8. A method according to claim 4 wherein the indication of quality is a received signal strength indication.

9. A method according to claim 4 wherein the updating step is performed using a tracker selected from the group consisting of a Kalman-type tracker and a LMS type tracker.

10. An apparatus for tracking a modulated signal transmitted over a communication channel comprising:

means for receiving the modulated signal from the communication channel;

means for demodulating the received signal based on a channel estimate to provide a symbol estimate and an indication of the quality of the symbol estimate; and means for updating the channel estimate with a variable delay wherein the variable delay is based on the indication of quality of the symbol estimate.

11. An apparatus according to claim 10 wherein the means for updating comprises:

means for comparing the indication of quality of the symbol estimate to an acceptance value;

means for generating an updated channel estimate based on the symbol estimate if the indication of quality of the symbol estimate meets the acceptance value; and means for generating an updated channel estimate based on a previous symbol estimate having an indication of quality which meets the acceptance value if the indication of quality of the symbol estimate does not meet the acceptance value.

12. An apparatus according to claim 11 wherein the previous symbol estimate has an associated delay relative to the symbol estimate and wherein the means for generating an updated channel estimate based on a previous symbol estimate having an indication of quality which meets the acceptance value if the indication of quality of the symbol estimate does not meet the acceptance value further comprises:

means for establishing a tracking coefficient based on the associated delay; and means for generating an updated channel estimate based on the tracking coefficient.

13. An apparatus according to claim 12 wherein the means for establishing comprises means for raising a base tracking coefficient to a power corresponding to the associated delay to provide the tracking coefficient.

14. An apparatus according to claim 13 wherein the modulated signal is a radio communication signal.

15. An apparatus according to claim 13 wherein the means for demodulating further comprises means for coherently demodulating the received signal using maximum likelihood sequence estimation.

16. An apparatus according to claim 15 wherein:

the means for coherently demodulating the received signal provides a plurality of candidate states each having an associated symbol estimate and indication of the quality of the associated symbol estimate; and wherein the means for updating further comprises means for providing a separate updated channel estimate for each state based on the associated symbol estimate and indication of the quality of the associated symbol estimate for each state.

17. An apparatus according to claim 13 wherein the indication of quality is a received signal strength.

18. An apparatus according to claim 13 wherein the means for updating is a tracker selected from the group consisting of a Kalman-type tracker and a LMS type tracker.

19. A channel tracker for a modulated signal receiver apparatus including a demodulator having hard and soft outputs, the channel tracker comprising:

a variable delay channel tracker circuit having a channel estimate output coupled to the demodulator; and a delay determination circuit coupled to the soft output of the demodulator and the channel tracker circuit.

20. A channel tracker according to claim 19 wherein the variable delay channel tracker circuit is selected from the group consisting of a Kalman-type tracker and a LMS type tracker.

21. A channel tracker according to claim 19 wherein the delay determination circuit comprises:

means for comparing the soft output to an acceptance value;

means for providing an indication to the variable delay channel tracker circuit to update the channel estimate based on the hard output if the soft output meets the acceptance value; and means for providing a delay count to the variable delay channel tracker circuit for use in generating the channel estimate output if the soft output does not meet the acceptance value.

22. A method for tracking a modulated signal transmitted over a communication channel comprising the steps of:

receiving the modulated signal from the communication channel;

demodulating the received signal based on a channel estimate to provide a symbol estimate;

generating a received signal strength indication based on the received signal; and updating the channel estimate with a variable delay wherein the variable delay is based on the received signal strength indication, wherein the updating step comprises the steps of:

comparing the received signal strength indication to an acceptance value;

generating an updated channel estimate based on the symbol estimate if the received signal strength indication meets the acceptance value; and generating an updated channel estimate based on a previous symbol estimate having a received signal strength indication which meets the acceptance value if the received signal strength indication does not meet the acceptance value.

23. An apparatus for tracking a modulated signal transmitted over a communication channel comprising:

means for receiving the modulated signal from the communication channel;

means for demodulating the received signal based on a channel estimate to provide a symbol estimate;

means for generating a received signal strength indication based on the received signal; and means for updating the channel estimate with a variable delay wherein the variable delay is based on the received signal strength indication, wherein the means for updating comprises:

means for comparing the received signal strength indication to an acceptance value;

means for generating an updated channel estimate based on the symbol estimate if the received signal strength indication meets the acceptance value; and means for generating an updated channel estimate based on a previous symbol estimate having a received signal strength indication which meets the acceptance value if the received signal strength indication does not meet the acceptance value.

* * * * *

UNITED STATES PATENT AND TRADEMARK OFFICE
CERTIFICATE OF CORRECTION

PATENT NO. : 6,370,189 B1
DATED : April 9, 2002
INVENTOR(S) : Khayrallah

It is certified that error appears in the above-identified patent and that said Letters Patent is hereby corrected as shown below:

<u>Title page,</u>
Item [12], Title, should read -- **United States Patent
Khayrallah** --
Item [75], should read:
-- Inventors:   Ali S. Khayrallah, Apex, NC (US) --

Signed and Sealed this

Fourth Day of May, 2004

JON W. DUDAS
*Acting Director of the United States Patent and Trademark Office*